Y. Y. LI.
METHOD OF MANUFACTURING PRODUCTS FROM SOJA.
APPLICATION FILED OCT. 10, 1911.
1,064,841.
Patented June 17, 1913.
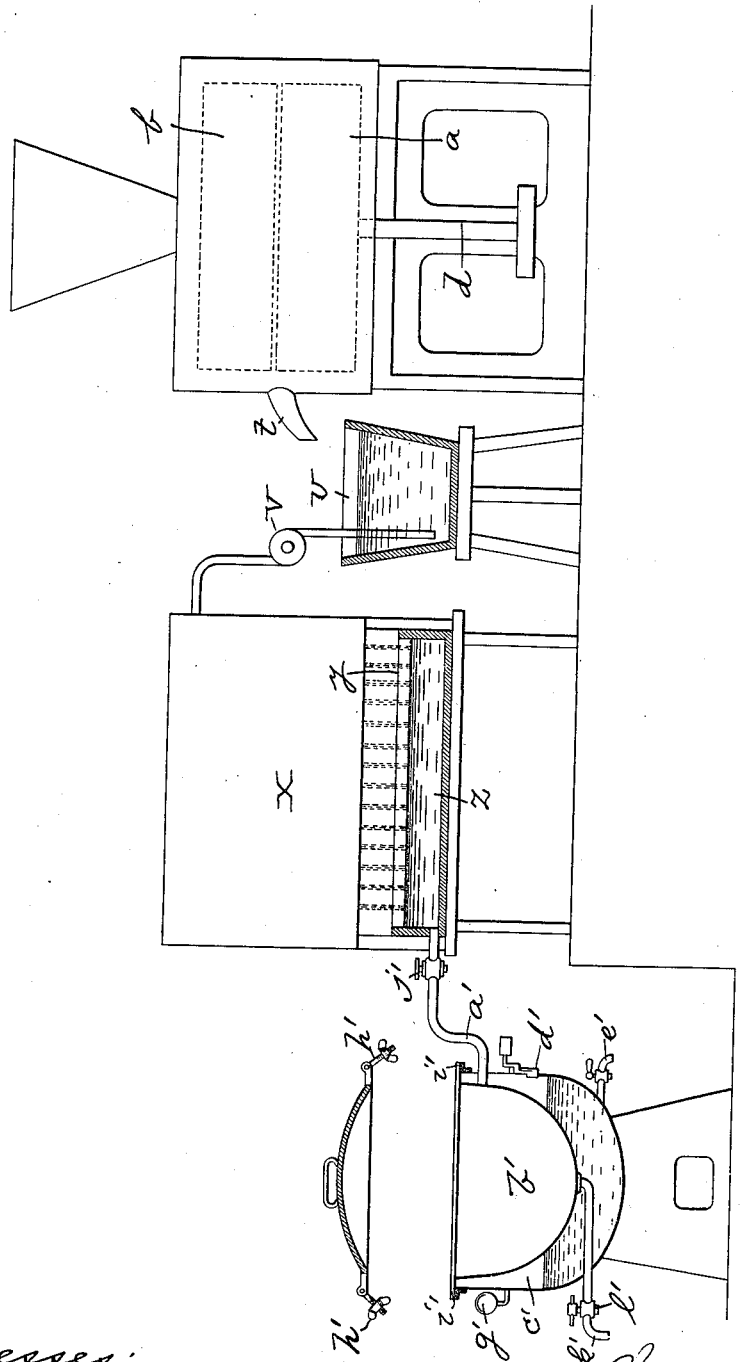

UNITED STATES PATENT OFFICE.

YU YING LI, OF VALLÉES, FRANCE.

METHOD OF MANUFACTURING PRODUCTS FROM SOJA.

1,064,841.

Specification of Letters Patent. Patented June 17, 1913.

Application filed October 10, 1911. Serial No. 653,820.

*To all whom it may concern:*

Be it known that I, YU YING LI, a subject of the Emperor of China, residing at Vallées, in France, have invented a certain new and useful Method of Manufacturing a Product from *Soja*, of which the following is a full, clear, and exact description.

The object of this invention is to provide a simple, efficient and economical method of producing a product from soja beans, and from which product it is possible to obtain by adding certain substances a product resembling human or animal milk, and also to obtain fresh or fermented cheese, milk in the form of powder and concentrated milk, fermented milk, sauces, preserves, etc. The manufacture of this milk comprises a series of operations viz., the cleaning and decorticating of the beans, which are effected in the ordinary manner, the grinding of the said grain previously mixed with a certain quantity of water, the passing of the crude product through a filtering press, from which the liquid, which is of a milky color, runs off to cool through a filter and passes thence into a boiler heated with a water bath, where it is pasteurized or sterilized, and from which it is removed, ready to be delivered for consumption as milk, or for use in the manufacture of the products mentioned above.

The apparatus necessary for this manufacture is illustrated in the accompanying drawings by a longitudinal sectional elevation.

The clear paste produced by the grinding of the grain in combination with the water that enters passes into the chute *t* that conveys it into a tank *u* from which it is drawn off by the pump *v* which forces it under pressure into the filtering press *x*. When leaving the filter it passes through a sieve *y* and then falls into a vat *z* and is conveyed through a pipe *a'* to the boiler or digester *b'*. This boiler or digester *b'* is heated in a hot-water bath *c'* provided with a feed-admission *d'*, a valved outlet *e'* and finally a manometer *g'*. The cover of the digester *b'* is fixed by means of pivoted bolts, with nuts *h'* which fix them in the lugs *i'*. The entrance of the liquid into the boiler or digester is regulated by the cock *j'*. Its escape is effected through the pipe *k'* regulated by the cock *l'*. When the liquid has entered the boiler, it is heated to a variable temperature for the purpose of pasteurization or sterilization. It is then bottled and is ready for consumption. When the operation is finished, the grain is removed from the filter-press and now forms cakes which can be utilized for feeding human beings (they are in that case dried and reduced to powder). They may also be used for feeding cattle, and, even if these cakes are greatly exhausted, they form a very good nitrated manure, after undergoing certain treatment; drying and dressing.

The soja milk contains more casein and less lactose and butter than human or animal milk, but by reducing its quantity of casein by adding certain matters a product is obtained resembling human and animal milk. With this milk fresh or fermented cheese can be made as desired.

In making fresh cheese, the milk is curdled or coagulated by means of magnesia salts, organic acids and ferments, rennet or lactic ferments.

The coagulated milk is molded and pressed, and cheese of different forms and consistency obtained according to the degree of coagulation or pressure. The cheeses may be eaten fresh or they may be dried. They are salted or not according to the nature of the manufacture. The liquid that remains after the pressing may be used for feeding a certain class of animals, or be employed in other ways.

In producing fermented cheese: Roquefort, Permesan, Romatour, Camembert, Gruyère, etc., ferments suitable for the manufacture of those products are employed.

The milk in the form of powder and the concentrated milk are obtained in accordance with the principles employed for animal milk, but one point has to be observed with regard to its manufacture. The soja milk, being artificial, may be easily obtained at a certain consistency, which enables economy to be effected in time and heating in the course of the concentration.

The fermented milk is obtained by using ferments such as the ferments employed in producing fermented milks— kephir, yoghourt, koumis, etc. These are the *Saccharomyces cerevisiæ*, *Dispora caucasica*, *Maya bulgare*, etc., and the manufacture is effected by modifying the said milk through the addition of sugar (glucose, levulose, etc.), and more particularly lactose.

The casein derived from *Soja* is manufactured either from the milk itself obtained as indicated or with the cakes remaining after the extraction of the oil or fatty matter of the soja beans. For making casein with the cakes it is necessary that the cakes should be previously crushed. It is obvious that the casein of the cakes is necessarily far less rich in fatty matters.

In order to prepare it the soja milk is coagulated. The coagulation having been effected, the product is dried, asepticized or not, ground or not, and may be employed as an alimentary or as an industrial product. This latter product may be employed for all purposes; paste, bedding paper, manufacture of the objects, etc., the same as animal casein. To the casein thus obtained chemical products such as borax, oxid of zinc, magnesia, gelatin, etc., may be added in different proportions in order to obtain solid casein. It is also possible to produce sauce with soja milk the fermentation of which is effected by means of special ferments such as sojaobacille and the acetomyces. This sauce is more or less salted with chlorid of sodium, and an addition may be made of spices; pepper, clove, nutmeg, piment, etc. The sauce having been made may be concentrated or dried by heating. Soja preserves may also be obtained with soja milk slightly thickened with sugar. In this case, the soja grains are cooked before being ground and may be mixed with or added to dry fruits, chestnuts, almonds, hazelnuts, cocoa, etc.

Claim:

The hereindescribed method of producing a product from soja beans which consists in cleaning and decorticating the beans, grinding the beans previously mixed with water, subjecting the ground product to pressing and filtering operations, and then heating the filtered liquid to a temperature necessary to effect pasteurization or sterilization.

In testimony whereof he affixes his signature in presence of two witnesses.

LI YU YING.

Witnesses:
H. C. COXE,
ALEXANDRE MATHIEU.